United States Patent
Kim et al.

(10) Patent No.: US 10,243,199 B2
(45) Date of Patent: Mar. 26, 2019

(54) METHOD FOR MANUFACTURING ELECTRODE

(71) Applicant: LG CHEM, LTD., Seoul (KR)

(72) Inventors: Young-Jae Kim, Daejeon (KR); Je-Young Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 15/743,754

(22) PCT Filed: Mar. 21, 2017

(86) PCT No.: PCT/KR2017/003027
§ 371 (c)(1),
(2) Date: Jan. 11, 2018

(87) PCT Pub. No.: WO2017/171294
PCT Pub. Date: Oct. 5, 2017

(65) Prior Publication Data
US 2018/0205065 A1    Jul. 19, 2018

(30) Foreign Application Priority Data

Mar. 28, 2016 (KR) .......................... 10-2016-0036912

(51) Int. Cl.
*H01M 4/04* (2006.01)
*H01M 4/139* (2010.01)
(Continued)

(52) U.S. Cl.
CPC .......... *H01M 4/0404* (2013.01); *H01M 4/04* (2013.01); *H01M 4/0433* (2013.01);
(Continued)

(58) Field of Classification Search
CPC ............. H01M 4/0404; H01M 4/0433; H01M 4/0435; H01M 4/1391; H01M 10/0525
(Continued)

(56) References Cited

U.S. PATENT DOCUMENTS 7,091,149 B2 * 8/2006 Iwasaki ............... H01M 4/8605
156/247
9,543,568 B2 * 1/2017 Sung ........................ H01M 4/13
(Continued)

FOREIGN PATENT DOCUMENTS

JP           56123668    *  9/1981
JP         2015138619    *  7/2015
(Continued)

OTHER PUBLICATIONS

International Search Report, issued in PCT/KR2017/003027, dated Jun. 30, 2017.

*Primary Examiner* — Brian K Talbot
(74) *Attorney, Agent, or Firm* — Birch, Stewart, Kolasch & Birch, LLP

(57) ABSTRACT

The present disclosure is intended to reduce the resistance of a high-loading electrode, to improve the impregnation ability of an electrolyte and thus to improve the rate characteristics of a battery. The present disclosure provides a method for manufacturing an electrode which includes the steps of: a coating step in which electrode active material slurry containing an electrode active material, a binder and a solvent is applied to at least one surface of an electrode current collector; a drying step in which the electrode current collector coated with the electrode active material slurry is introduced continuously to a drying system to dry the coated electrode active material slurry; and a rolling step in which the dried electrode active material slurry is rolled, wherein the coating step includes applying the electrode active material slurry in a loading amount of 500 mg/cm² to 1500 mg/cm², and the method further comprises a pattern forming step carried out simultaneously with the drying step and forming a plurality of longitudinal patterns on the surface of the coated electrode active material slurry.

19 Claims, 7 Drawing Sheets

(51) Int. Cl.
*H01M 4/1391* (2010.01)
*H01M 10/0525* (2010.01)

(52) U.S. Cl.
CPC ......... *H01M 4/0435* (2013.01); *H01M 4/139* (2013.01); *H01M 4/1391* (2013.01); *H01M 10/0525* (2013.01); *H01M 2220/20* (2013.01); *H01M 2300/004* (2013.01)

(58) Field of Classification Search
USPC .......................................................... 427/58
See application file for complete search history.

(56) References Cited

U.S. PATENT DOCUMENTS

| | | | |
|---|---|---|---|
| 9,819,029 B2* | 11/2017 | Arpin | H01M 4/9041 |
| 2004/0001986 A1* | 1/2004 | Yazici | H01M 4/8892 |
| | | | 502/101 |
| 2013/0224584 A1 | 8/2013 | Sung et al. | |
| 2013/0295440 A1 | 11/2013 | Lee et al. | |

FOREIGN PATENT DOCUMENTS

| | | | |
|---|---|---|---|
| KR | 10-2012-0124077 A | | 11/2012 |
| KR | 10-2013-0116829 A | | 10/2013 |
| KR | 10-2014-0070198 A | | 6/2014 |
| KR | 10-2014-0073719 A | | 6/2014 |
| KR | 20140070198 A | * | 6/2014 |
| KR | 10-20140099709 A | | 8/2014 |
| KR | 10-2015-0082958 A | | 7/2015 |

\* cited by examiner

METHOD FOR MANUFACTURING ELECTRODE

TECHNICAL FIELD

The present disclosure relates to a method for manufacturing an electrode.

The present application claims priority to Korean Patent Application No. 10-2016-0036912 filed on Mar. 28, 2016 in the Republic of Korea, the disclosures of which are incorporated herein by reference.

BACKGROUND ART

As technological development and a need for mobile instruments have increased, a demand for secondary batteries as energy sources has increased rapidly. Among such secondary batteries, lithium secondary batteries having high energy density and voltage, long cycle life and a low discharging rate have been commercialized and used widely. A lithium secondary battery includes a positive electrode, a negative electrode and a separator interposed between the positive electrode and the negative electrode, and the electrode, such as a positive electrode or negative electrode, is obtained by applying electrode slurry containing an electrode active material, binder and a solvent to an electrode current collector, and carrying out drying and rolling.

Recently, as the attention to environmental problems has increased, there has been grown the market of systems using a high-capacity battery, such as electric vehicles and hybrid electric vehicles capable of substituting for vehicles using fossil fuel, including gasoline vehicles and diesel vehicles, one of the main causes of air pollution. In addition, as a power source for such systems, there is a need for designing a high-capacity electrode for manufacturing a lithium secondary battery having high energy density, high output and high discharge voltage.

In the market, a high-loading electrode is evaluated as a loading amount of at least 950 mg/25 $cm^2$ or more on the positive electrode basis and a loading amount of at least 500 mg/25 $cm^2$ or more on the negative electrode basis. There has been an attempt to increase the amount of an electrode active material to design a high-loading electrode and thus a high-loading electrode having a large thickness of electrode active material layer has been suggested. However, such an electrode having a large thickness of electrode active material layer requires a relatively increased drying temperature during the manufacture of the electrode. Since the drying temperature is increased, a binder may be transported to the surface of the electrode active material layer, resulting in a problem of an increase in resistance of the electrode.

In addition, there is another problem in that such an increased thickness of electrode active material layer causes degradation of impregnation ability of an electrolyte, resulting in degradation of rate characteristics of a battery.

DISCLOSURE

Technical Problem

The present disclosure is designed to solve the problems of the related art, and therefore the present disclosure is directed to providing a method for manufacturing a high-loading electrode which shows decreased resistance and improved impregnation ability of an electrolyte.

Technical Solution

In one aspect of the present disclosure, there is provided a method for manufacturing an electrode which includes the steps of: a coating step in which electrode active material slurry containing an electrode active material, a binder and a solvent is applied to at least one surface of an electrode current collector; a drying step in which the electrode current collector coated with the electrode active material slurry is introduced continuously to a drying system to dry the coated electrode active material slurry; and a rolling step in which the dried electrode active material slurry is rolled, wherein the coating step includes applying the electrode active material slurry in a loading amount of 500 mg/25 $cm^2$ to 1500 mg/25 $cm^2$, and the method further comprises a pattern forming step carried out simultaneously with the drying step and forming a plurality of longitudinal patterns on the surface of the coated electrode active material slurry.

Preferably, the pattern forming step may be carried out by allowing a pattern forming unit provided in the drying system to pressurize the surface of the electrode active material slurry so that a plurality of patterns may be formed.

Preferably, the patterns may have a width of 0.2-0.4 mm and an interval between the patterns of 1-3 mm.

Preferably, the electrode may be a positive electrode or negative electrode.

Preferably, the electrode active material slurry may be applied in an amount of 950 mg/25 $cm^2$ to 1500 mg/25 $cm^2$, when the electrode is a positive electrode, and in an amount of 500 mg/25 $cm^2$ to 750 mg/25 $cm^2$, when the electrode is a negative electrode.

Preferably, the drying step may be carried out at 80-100° C., when the electrode is a positive electrode, and at 50-65° C., when the electrode is a negative electrode.

Advantageous Effects

According to the method of the present disclosure, it is possible to reduce the resistance of a high-loading electrode and to improve the rate characteristics of a battery by improving the impregnation of an electrolyte.

DESCRIPTION OF DRAWINGS

The accompanying drawings illustrate a preferred embodiment of the present disclosure and together with the foregoing disclosure, serve to provide further understanding of the disclosure of the present disclosure, and thus, the present disclosure is not construed as being limited to the drawing.

DESCRIPTION OF DRAWING NUMERALS

Figure 1:
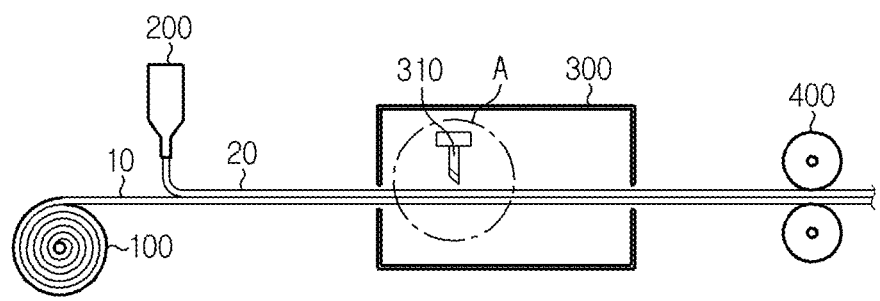
FIG. 1 is a schematic view illustrating the method for manufacturing an electrode according to an embodiment of the present disclosure.

10: Electrode assembly
20: Electrode active material slurry

100: Electrode current collector roll
200: Coating system
300: Drying system
310: Pattern forming unit
400: Roller

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

According to the related art, an electrode is obtained by applying electrode slurry containing an electrode active material, a binder and a solvent to an electrode current collector, followed by drying and rolling. However, when a high-loading electrode having a loading amount of 950 mg/25 cm$^2$ or more on the positive electrode basis, and a loading amount of 500 mg/25 cm$^2$ or more on the negative electrode basis is to be manufactured, the electrode active material layer has an increased thickness and thus requires a relatively higher drying temperature during the manufacture of the electrode. In addition, the binder of the electrode active material layer may be transported to the surface of the electrode active material layer as the drying temperature is increased, thereby causing a problem of an increase in the resistance of the electrode. Further, as the thickness of the electrode active material layer is increased, impregnation ability of an electrode is degraded, resulting in degradation of the rate characteristics of a battery.

According to the present disclosure, in the step of drying the electrode active material slurry, a plurality of longitudinal pattern is formed on the surface coated with the electrode active material slurry to prevent the binder from being transported to the surface. In this manner, it is possible to reduce the resistance of the electrode and to improve the impregnation ability of an electrolyte, thereby improving the rate characteristics of a battery.

The method for manufacturing an electrode according to the present disclosure, like the conventional method for manufacturing an electrode, includes the steps of: a coating step in which electrode active material slurry containing an electrode active material, a binder and a solvent is applied to at least one surface of an electrode current collector; a drying step in which the electrode current collector coated with the electrode active material slurry is introduced continuously to a drying system to dry the coated electrode active material slurry; and a rolling step in which the dried electrode active material slurry is rolled.

The electrode active material may be a positive electrode active material or a negative electrode active material.

The positive electrode active material may include lithium-containing oxides, preferably lithium-containing transition metal oxides. Particular examples of the lithium-containing transition metal oxides include any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, O≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-x}Co_2O_4$ (0.5<x<1.3, 0<z<2), $Li_xCoPO_4$ (0.5<x<1.3) and $Li_xFePO_4$ (0.5<x<1.3), or a combination of two or more of them. In addition, the lithium-containing transition metal oxides may be coated with a metal, such as aluminum (Al), or metal oxide. Further, sulfides, selenides and halides may also be used, in addition to the lithium-containing transition metal oxides.

The negative electrode active material is capable of lithium ion intercalation/deintercalation and particular examples thereof include lithium metal, a carbonaceous material, metal compound, and a combination thereof.

Particularly, low crystalline carbon and high crystalline carbon may be used as carbonaceous material. Typical examples of low crystalline carbon include soft carbon and hard carbon. Typical examples of high crystalline carbon include Kish graphite, pyrolytic carbon, mesophase pitch based carbon fibers, meso-carbon microbeads, mesophase pitches, and high-temperature baked carbon, such as petroleum or coal tar pitch-derived cokes.

Particular examples of the metal compound include compounds containing at least one metal element, such as Si, Ge, Sn, Pb, P, Sb, Bi, Al, Ga, In, Ti, Mn, Fe, Co, Ni, Cu, Zn, Ag, Mg, Sr and Ba. Although such metal compounds may be used in any one of the forms, including simple substance, alloy, oxides ($TiO_2$, $SnO_2$, etc.), nitride, sulfide, boride and alloy with lithium, simple substance, oxides and alloy with lithium may have high capacity. Particularly, metal compounds which may contain at least one element selected from Si, Ge and Sn and contain at least one element selected from Si and Sn can provide a battery with higher capacity.

The binder may be any one selected from the group consisting of polyvinylidene fluoride, hexafluoropropylene (HFP), polyvinylidene fluoride-co-hexafluoropropylene (PVDF-co-HFP), polyvinylidene fluoride-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile-styrene-butadiene copolymer and polyamide, or a combination of two or more of them.

The solvent may include any one selected from the group consisting of acetone, tetrahydrofuran, methylene chloride, chloroform, dimethyl formamide, N-methyl-2-pyrrolidone (NMP), cyclohexane and water, or a mixture of two or more of them.

The electrode current collector may be a positive electrode current collector or negative electrode current collector.

The positive electrode current collector is not particularly limited, as long as it has high conductivity while not causing any chemical change in a battery. Particular examples of the positive electrode current collector include stainless steel, aluminum, nickel, titanium or baked carbon; aluminum or stainless steel surface-treated with carbon, nickel, titanium or silver; or the like.

The negative electrode current collector is not particularly limited, as long as it has conductivity while not causing any chemical change in a battery. Particular examples of the negative electrode current collector include copper, stainless steel, aluminum, nickel, titanium or baked carbon; copper or stainless steel surface-treated with carbon, nickel, titanium or silver; aluminum-cadmium alloy; or the like.

FIG. 1 is a schematic view illustrating the method for manufacturing an electrode according to an embodiment of the present disclosure. Referring to FIG. 1, an electrode current collector roll 100, on which an electrode current collector 10 is wound, is unwound and supplied. Electrode active material slurry 20 is applied to one surface of the electrode current collector 10 through a coating system 200. The electrode collector 10 coated with the electrode active material slurry 20 is introduced continuously to a drying system 300 to carry out a drying step. In the drying step, a plurality of longitudinal patterns is formed on the surface of the electrode active material slurry 20 through a pattern forming unit 310 provided in the drying system 300. Then, the electrode active material slurry 20 is rolled through a roller 400.

The electrode active material slurry coated on at least one surface of the electrode current collector may be applied in a loading amount of 950 mg/25 cm$^2$ to 1500 mg/25 cm$^2$, when the electrode is a positive electrode, and in a loading amount of 500 mg/25 cm$^2$ to 750 mg/25 cm$^2$, when the electrode is a negative electrode in order to accomplish a high-loading electrode.

The drying step includes allowing the solvent contained in the electrode active material slurry to evaporate. When the electrode is a positive electrode, the drying step may be carried out at 80-100° C. When the electrode is a negative electrode, the drying step may be carried out at 50-65° C. In the case of the conventional electrode, the drying step is carried out at 120-130° C. in the case of a positive electrode and at 70-80° C. in the case of a negative electrode. However, in the method for manufacturing an electrode according to the present disclosure, it is possible to carry out a drying step at relatively lower temperature by virtue of the patterns formed on the surface of the electrode active material slurry.

The pattern forming step is carried out simultaneously with the drying step, and includes forming a plurality of longitudinal patterns on the surface of the electrode active material slurry. When the pattern forming step is carried out prior to the drying step, the electrode active material slurry cannot be dried and has low viscosity, and thus a pattern cannot be formed adequately. When the pattern forming step is carried out after the drying step, the solvent contained in the electrode active material slurry evaporates to generate cracks at the portion coated with the electrode active material slurry or to cause dust generation. Therefore, the pattern forming step is carried out preferably simultaneously with the drying step.

Figure 2:
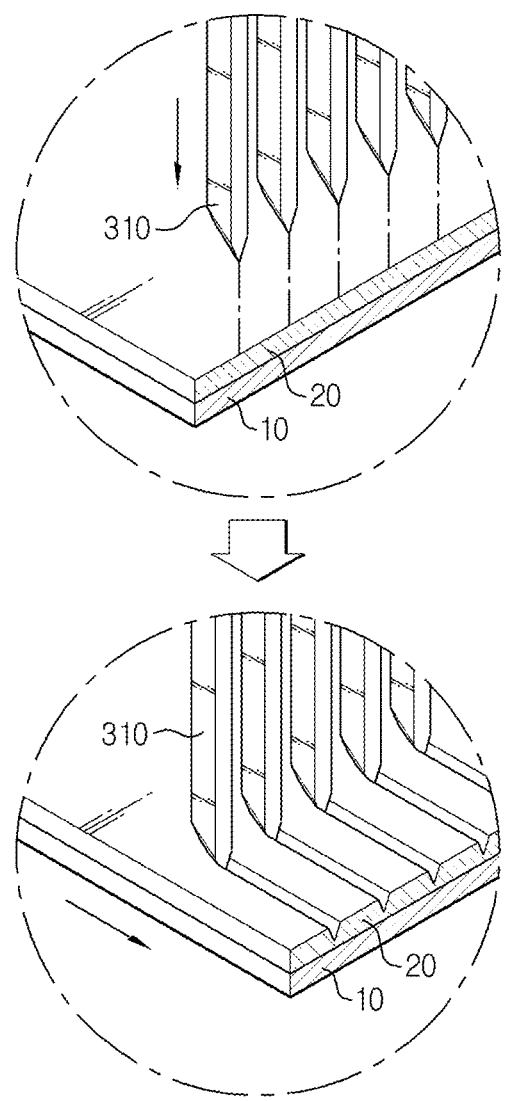
FIG. 2 is a schematic view illustrating part A of FIG. 1.

FIG. 2 is a schematic view illustrating part A of FIG. 1. Referring to FIG. 2, the electrode current collector 10 coated with the electrode active material slurry 20 is introduced continuously to a drying system. The pattern forming unit 310 provided in the drying system moves downwardly to pressurize the surface of the electrode active material slurry 20. Thus, a plurality of longitudinal patterns is formed on the surface of the electrode active material slurry along the direction of progress.

The pattern may be formed with a width of 0.2-0.4 mm and the interval between patterns may be 1-3 mm.

The rolling step includes rolling the dried and pattern-formed electrode active material slurry. Thus, it is possible to prevent generation of burr (surface fluff of electrode active material or binder) during the formation of patterns.

Figure 3:
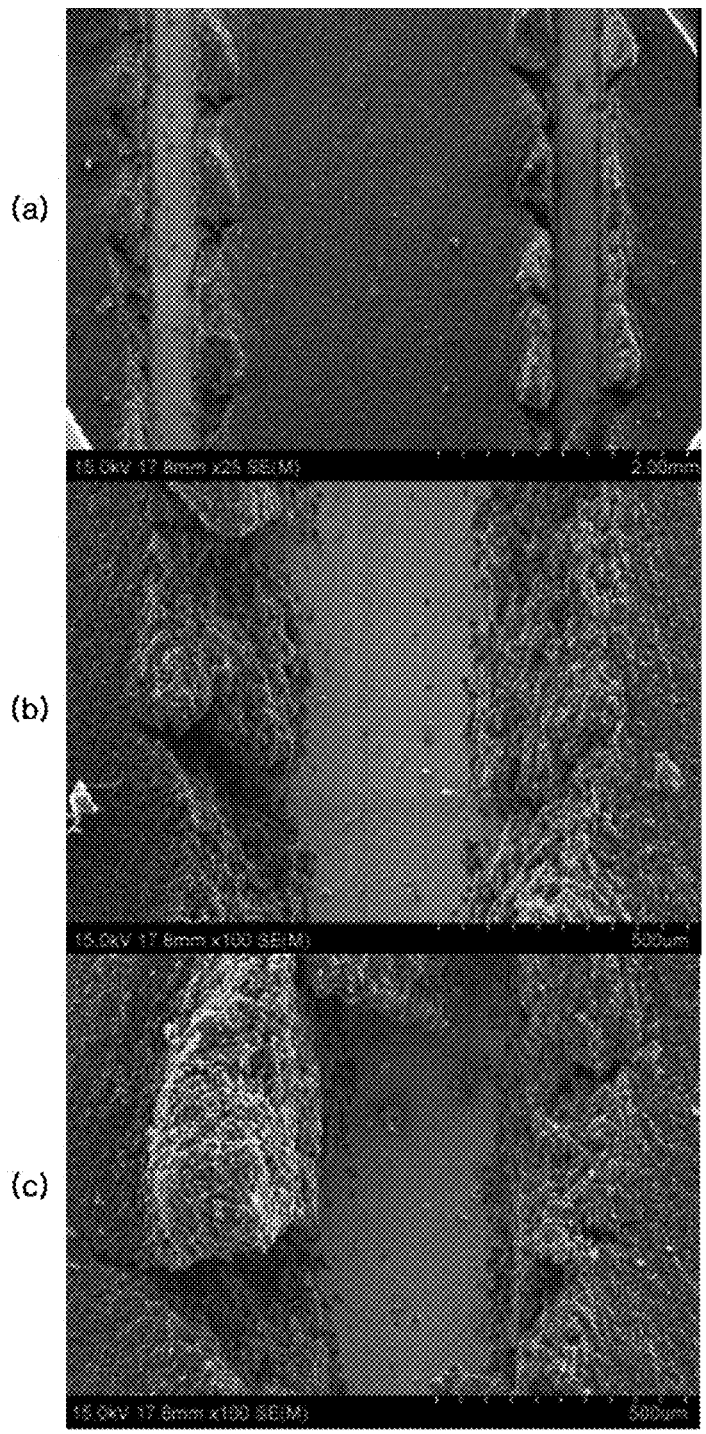
FIG. 3 and FIG. 4 are scanning electron microscopic (SEM) images illustrating the surface of the electrode obtained according to an embodiment of the present disclosure.
Figure 4:
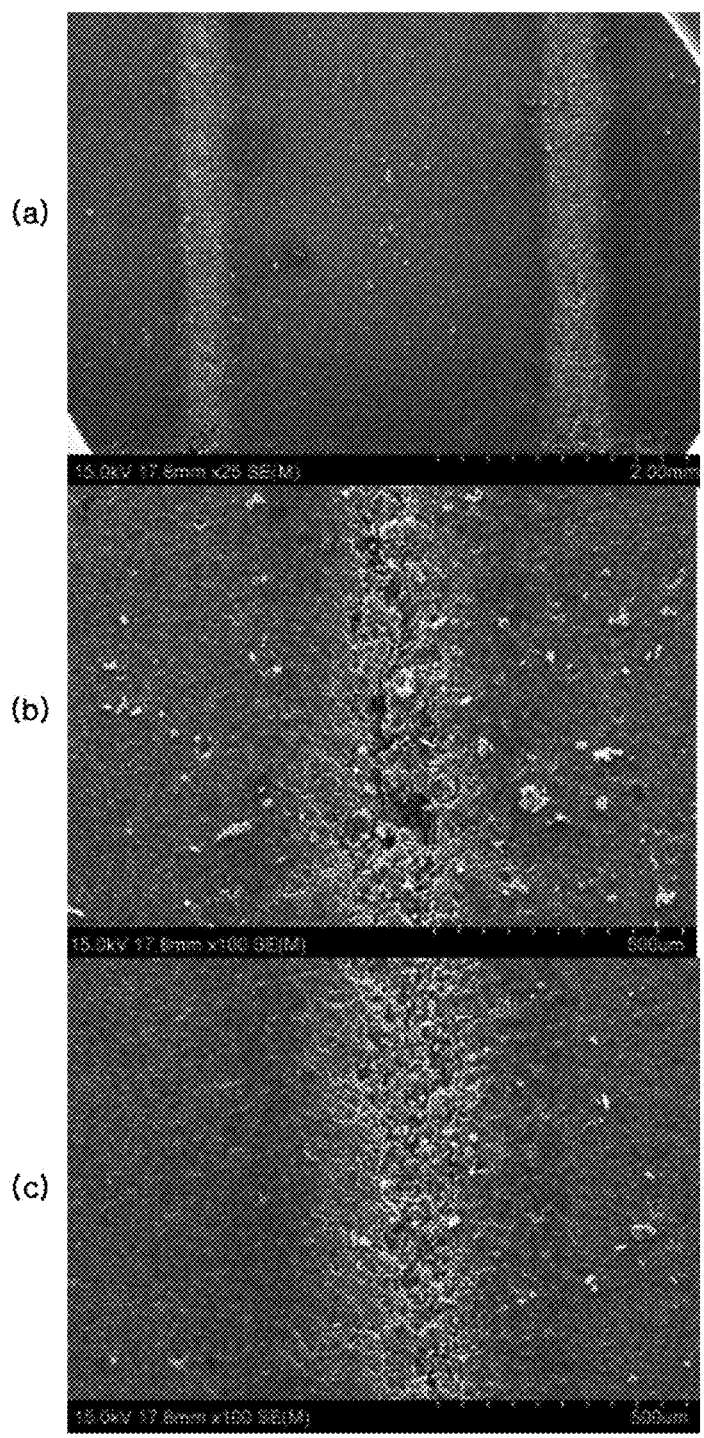

FIG. 3 and FIG. 4 are scanning electron microscopic (SEM) images illustrating the surface of the electrode obtained according to an embodiment of the present disclosure. FIG. 3 shows a SEM image of the electrode surface before rolling, and FIG. 4 shows a SEM image of the electrode surface after rolling, wherein (a), (b) and (c) are SEM images taken at different magnifications. Referring to FIG. 3, there are portions where patterns are formed and the electrode collector is exposed. Referring to FIG. 4, it can be seen that the portions having patterns are partially filled with the electrode active material and binder through the rolling step, and thus have a plurality of pores. Therefore, it can be seen that it is possible to improve the impregnation ability of an electrolyte.

In another aspect, there is provided an electrode obtained by the above-described method.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example

First, a mixture containing 97.9 wt % of Li(Ni$_{1/3}$/Mn$_{1/3}$Co$_{1/3}$)O$_2$ as a positive electrode active material, 0.5 wt % of carbon black (conductive material) and 1.6 wt % of polyvinylidene fluoride (PVdF, binder) was mixed in N-methyl pyrrolidone (NMP) as a solvent to provide positive electrode active material slurry. Herein, the amount of NMP was controlled to be 77.9 wt % in the positive electrode active material slurry. The positive electrode active material slurry was applied to aluminum foil in a loading amount of 956 mg/25 cm$^2$ and dried in a vacuum oven at 120° C. for 10 hours or more, while forming a plurality of patterns having a width of 0.3 mm and an interval between patterns of 1 mm. Then, pressing was carried out by using a roll-type press to obtain a positive electrode having a thickness of 135 μm.

In addition, a mixture containing 1 wt % of carbon black, 95.6 wt % of artificial graphite as a negative electrode active material, 2.3 wt % of styrene butadiene rubber (SBR) binder and 1.1 wt % of carboxymethyl cellulose (CMC) was mixed in NMP as a solvent to provide negative electrode active material slurry. Herein, the amount of NMP was controlled to be 51 wt % in the negative electrode active material slurry. The negative electrode active material slurry was applied to copper foil in a loading amount of 539 mg/25 cm$^2$ and dried in a vacuum oven at 100° C. for 10 hours or more, while forming a plurality of patterns having a width of 0.3 mm and an interval between patterns of 1 mm. Then, pressing was carried out by using a roll-type press to obtain a negative electrode having a thickness of 167 μm.

The obtained negative electrode and positive electrode were used and a polyolefin separator was interposed between the negative electrode and the positive electrode. Then, an electrolyte containing 1M LiPF$_6$ dissolved in ethylene carbonate (EC), propylene carbonate (PC) and ethyl methyl carbonate (EMC) at a volume ratio of 2:1:7, in combination with 1.5 wt % of vinylene carbonate (VC) and 0.5 wt % of polystyrene as additives, was injected to obtain a mono-cell having a size of 12.6 cm$^2$ on the positive electrode basis and 13.33 cm$^2$ on the negative electrode basis.

Comparative Example

A mono-cell was obtained in the same manner as Example, except that no patterns were formed in the positive electrode and the negative electrode.

Discharge Rate Characteristics

Each of the mono-cells according to Example and Comparative Example was determined for discharge rate characteristics based on 0.1 C. The results are shown in FIG. 5.

Figure 5:
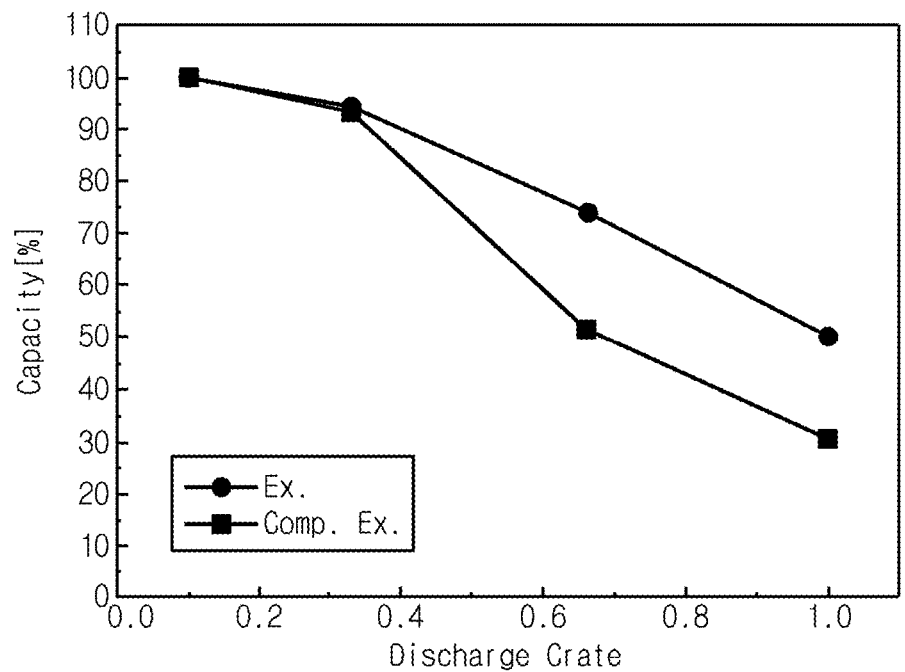
FIG. 5 is a graph illustrating the discharge capacity of each of the mono-cells according to Example and Comparative Example.

Referring to FIG. 5, both mono-cells show the same rate characteristics up to 0.5 C, but the mono-cell according to Example show better rate characteristics after 0.5 C.

Charge Rate Characteristics

Each of the mono-cells according to Example and Comparative Example was determined for CC (constant current) charge rate characteristics. The results are shown in FIG. 6.

Figure 6:
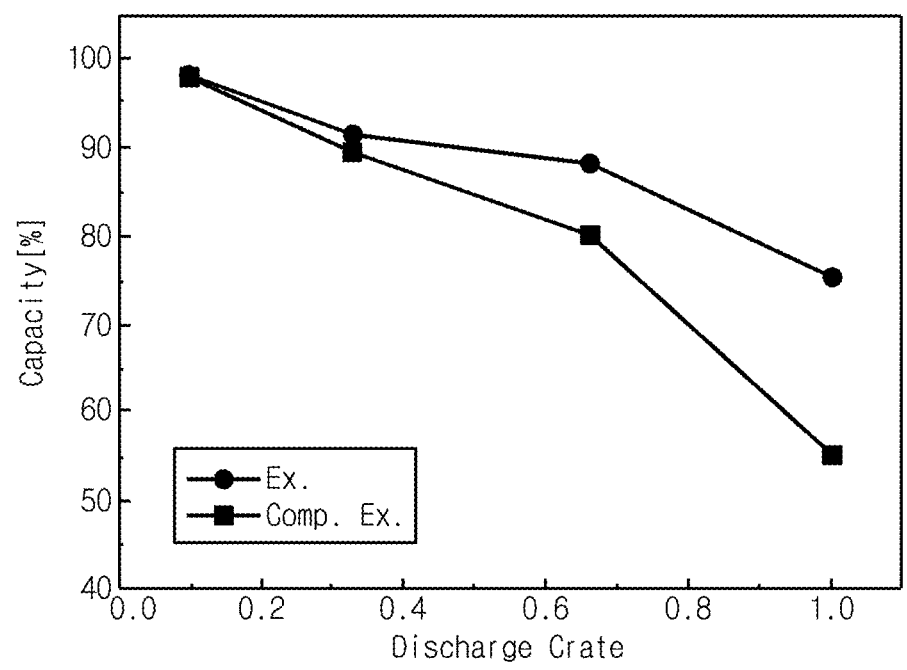
FIG. 6 is a graph illustrating the charge capacity of each of the mono-cells according to Example and Comparative Example.

It can be seen from FIG. 6, in the same manner as discharge rate characteristics, both mono-cells show the same rate characteristics up to 0.5 C, but the mono-cell according to Example show better rate characteristics after 0.5 C.

Evaluation of Resistance

To each of the mono-cells according to Example and Comparative Example, a high level of current was applied at a predetermine state of charge of cells. Then, the voltage was determined at that time to calculate resistance through the formula of V=IR. The calculated resistance values are shown in FIG. 7, general charge transfer resistance values representing voltage drop values caused by IR drop are shown in FIG. 8, and diffusion resistance values are shown in FIG. 9.

Figure 7:
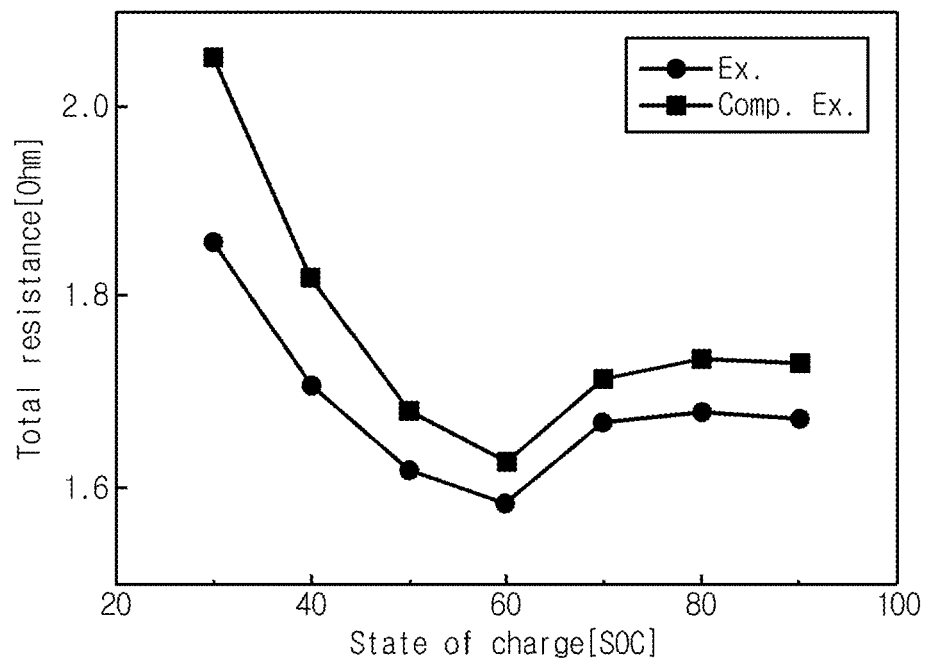
FIGS. 7-9 are graphs illustrating the resistance of each of the mono-cells according to Example and Comparative Example.
Figure 8:
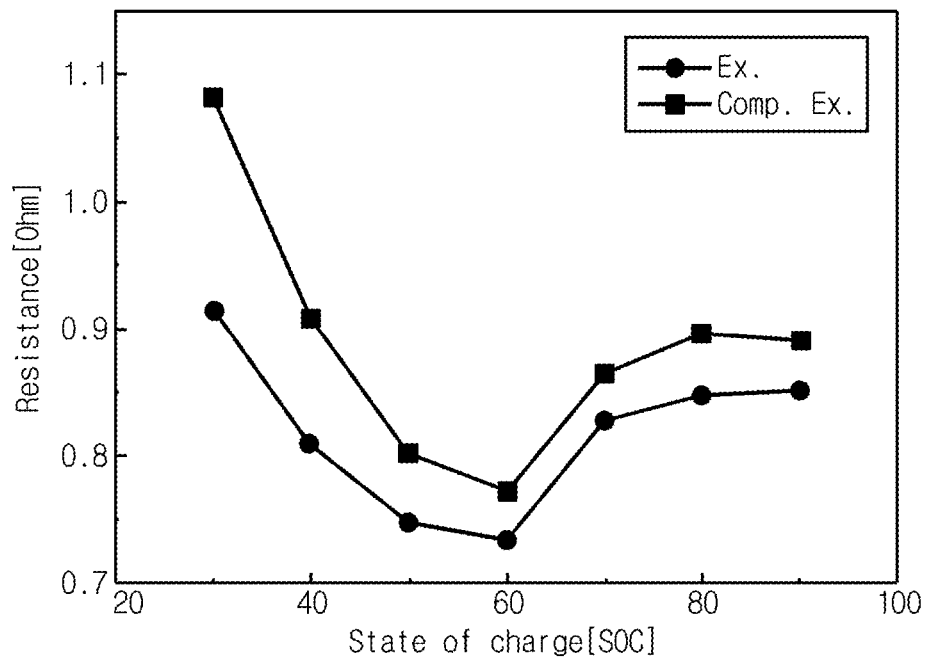
Figure 9:
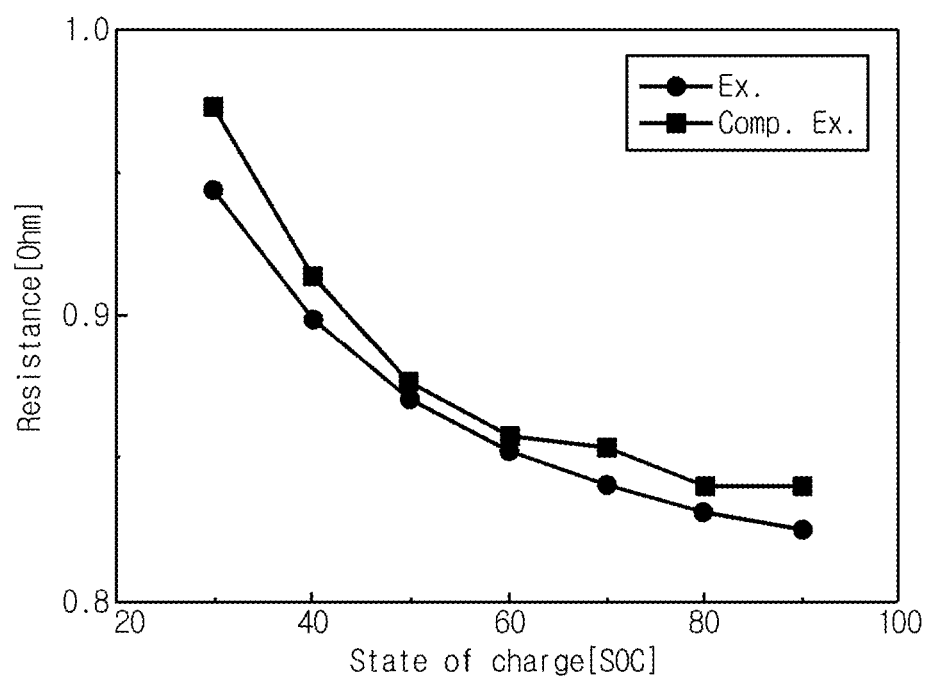

Referring to FIGS. 7-9, the mono-cell according to Example shows improved impregnation ability of the electrolyte, increased reactive surface area and homogeneous distribution of the electrolyte on the electrodes, and thus provides lower resistance values.

The present disclosure has been described in detail with reference to particular embodiments and drawings, but it should be understood that the scope of the present disclosure is not limited thereto. It should be also understood that various changes and modifications within the scope of the disclosure will become apparent to those skilled in the art from this detailed description.

What is claimed is:

1. A method for manufacturing an electrode which comprises the steps of:
   a coating step in which electrode active material slurry containing an electrode active material, a binder and a solvent is applied to at least one surface of an electrode current collector;
   a drying step in which the electrode current collector coated with the electrode active material slurry is introduced continuously to a drying system to dry the coated electrode active material slurry; and
   a rolling step in which the dried electrode active material slurry is rolled,
   wherein the coating step comprises applying the electrode active material slurry in a loading amount of 500 mg/25 cm$^2$ to 1500 mg/25 cm$^2$, and
   the method further comprises a pattern forming step carried out simultaneously with the drying step and forming a plurality of longitudinal patterns on the surface of the coated electrode active material slurry.

2. The method for manufacturing an electrode according to claim 1, wherein the pattern forming step is carried out by allowing a pattern forming unit provided in the drying system to pressurize the surface of the electrode active material slurry so that a plurality of patterns may be formed.

3. The method for manufacturing an electrode according to claim 1, wherein the patterns have a width of 0.2-0.4 mm and an interval between the patterns of 1-3 mm.

4. The method for manufacturing an electrode according to claim 1, wherein the electrode is a negative electrode.

5. The method for manufacturing an electrode according to claim 1, wherein the electrode active material slurry is applied in an amount of 950 mg/25 cm$^2$ to 1500 mg/25 cm$^2$, when the electrode is a positive electrode, and in an amount of 500 mg/25 cm$^2$ to 750 mg/25 cm$^2$, when the electrode is a negative electrode.

6. A method for manufacturing an electrode which comprises the steps of:
   a coating step in which electrode active material slurry containing an electrode active material, a binder and a solvent is applied to at least one surface of an electrode current collector;
   a drying step in which the electrode current collector coated with the electrode active material slurry is introduced continuously to a drying system to dry the coated electrode active material slurry; and
   a rolling step in which the dried electrode active material slurry is rolled,
   wherein the coating step comprises applying the electrode active material slurry in a loading amount of 500 mg/25 cm$^2$ to 1500 mg/25 cm$^2$, and
   the method further comprises a pattern forming step carried out simultaneously with the drying step and forming a plurality of longitudinal patterns on the surface of the coated electrode active material slurry so that there are portions where patterns are formed and the electrode collector is exposed.

7. The method for manufacturing an electrode according to claim 6, wherein the pattern forming step is carried out by allowing a pattern forming unit provided in the drying system to pressurize the surface of the electrode active material slurry so that a plurality of patterns may be formed.

8. The method for manufacturing an electrode according to claim 6, wherein the patterns have a width of 0.2-0.4 mm and an interval between the patterns of 1-3 mm.

9. The method for manufacturing an electrode according to claim 6, wherein the electrode is a negative electrode.

10. The method for manufacturing an electrode according to claim 6, wherein the electrode active material slurry is applied in an amount of 950 mg/25 cm$^2$ to 1500 mg/25 cm$^2$, when the electrode is a positive electrode, and in an amount of 500 mg/25 cm$^2$ to 750 mg/25 cm$^2$, when the electrode is a negative electrode.

11. The method for manufacturing an electrode according to claim 6, wherein the drying step is carried out at 80-100° C., when the electrode is a positive electrode, and at 50-65° C., when the electrode is a negative electrode.

12. A method for manufacturing an electrode which comprises the steps of:
   a coating step in which electrode active material slurry containing an electrode active material, a binder and a solvent is applied to at least one surface of an electrode current collector;
   a drying step in which the electrode current collector coated with the electrode active material slurry is introduced continuously to a drying system to dry the coated electrode active material slurry; and
   a rolling step in which the dried electrode active material slurry is rolled,
   wherein the coating step comprises applying the electrode active material slurry in a loading amount of 500 mg/25 cm$^2$ to 1500 mg/25 cm$^2$, the drying step is carried out at 80-100° C., when the electrode is a positive electrode, and at 50-65° C., when the electrode is a negative electrode, and the method further comprises a pattern forming step carried out simultaneously with the drying step and forming a plurality of longitudinal patterns on the surface of the coated electrode active material slurry.

13. The method for manufacturing an electrode according to claim 12, wherein the pattern forming step is carried out by allowing a pattern forming unit provided in the drying system to pressurize the surface of the electrode active material slurry so that a plurality of patterns may be formed.

14. The method for manufacturing an electrode according to claim 12, wherein the patterns have a width of 0.2-0.4 mm and an interval between the patterns of 1-3 mm.

15. The method for manufacturing an electrode according to claim 12, wherein the electrode is the negative electrode.

16. The method for manufacturing an electrode according to claim 12, wherein the electrode active material slurry is applied in an amount of 950 mg/25 $cm^2$ to 1500 mg/25 $cm^2$, when the electrode is a positive electrode, and in an amount of 500 mg/25 $cm^2$ to 750 mg/25 $cm^2$, when the electrode is a negative electrode.

17. The method for manufacturing an electrode according to claim 1, wherein the electrode is a positive electrode.

18. The method for manufacturing an electrode according to claim 6, wherein the electrode is a positive electrode.

19. The method for manufacturing an electrode according to claim 12, wherein the electrode is the positive electrode.

* * * * *